United States Patent
Tsirkin et al.

(10) Patent No.: US 11,847,227 B2
(45) Date of Patent: Dec. 19, 2023

(54) FIRMWARE VERSION CORRUPTION ATTACK PREVENTION

(71) Applicant: RED HAT, INC., Raleigh, NC (US)

(72) Inventors: Michael Tsirkin, Lexington, MA (US); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 236 days.

(21) Appl. No.: 17/107,467

(22) Filed: Nov. 30, 2020

(65) Prior Publication Data

US 2022/0171851 A1 Jun. 2, 2022

(51) Int. Cl.
*G06F 21/57* (2013.01)
*G06F 21/64* (2013.01)
*G06F 21/71* (2013.01)

(52) U.S. Cl.
CPC .......... *G06F 21/572* (2013.01); *G06F 21/577* (2013.01); *G06F 21/64* (2013.01); *G06F 21/71* (2013.01); *G06F 2221/033* (2013.01)

(58) Field of Classification Search
CPC ...... G06F 21/572; G06F 21/577; G06F 21/64; G06F 21/71; G06F 3/123; G06F 3/1225; G06F 21/51
See application file for complete search history.

(56) References Cited

U.S. PATENT DOCUMENTS

| | | | |
|---|---|---|---|
| 9,015,455 B2 | 4/2015 | Held et al. | |
| 9,565,207 B1 | 2/2017 | Marr et al. | |
| 9,607,155 B2 | 3/2017 | Beresnevichiene et al. | |
| 9,626,509 B1 | 4/2017 | Khalid et al. | |
| 10,162,964 B2 | 12/2018 | Igotti et al. | |
| 10,177,934 B1 | 1/2019 | Marr et al. | |
| 2003/0236970 A1* | 12/2003 | Palmer | H04L 9/40 719/321 |
| 2009/0167773 A1* | 7/2009 | Wang | G06F 9/5077 345/520 |
| 2016/0203095 A1* | 7/2016 | Chang | G06F 13/4221 710/316 |
| 2016/0210132 A1* | 7/2016 | Gerhart | G06F 8/65 |
| 2021/0216638 A1* | 7/2021 | Park | G06F 21/572 |
| 2022/0156377 A1* | 5/2022 | Xie | G06F 21/64 |

OTHER PUBLICATIONS

Seshadri, A. et al. (Oct. 14-17, 2007). "SecVisor: A Tiny Hypervisor to Provide Lifetime Kernel Code Integrity for Commodity OSes". CyLab/CMU, Pittsburgh, PA, USA, p. 17.

* cited by examiner

*Primary Examiner* — Jaweed A Abbaszadeh
*Assistant Examiner* — Hyun Soo Kim
(74) *Attorney, Agent, or Firm* — Womble Bond Dickinson (US) LLP (57) ABSTRACT

A method includes detecting a change in control of a peripheral device from a first security domain to a second security domain of a computer system and in response to detecting the change in control of the peripheral device, reading a current firmware version of the peripheral device and determining whether the current firmware version of the peripheral device is trusted by the computer system. The method further includes in response to determining that the current firmware version is trusted by the computer system, providing control of the peripheral device to the second security domain.

20 Claims, 6 Drawing Sheets

FIG. 6

FIRMWARE VERSION CORRUPTION ATTACK PREVENTION

TECHNICAL FIELD

Aspects of the present disclosure relate computer system security, and more particularly, firmware version corruption attack prevention.

BACKGROUND

Many smart devices include downloadable firmware to provide functionality to the device. Firmware can be updated and changed based on the functionality required by the device. These devices can be connected to and controlled by a computer system. Devices can also be accessed by a virtual environment of the computer system via device pass through in which the virtual environment can directly access and control the device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Several types of peripheral devices can be connected to a computer system to provide functionalities beyond the general capabilities of the computer system. Many peripheral devices may include a programmable component, referred to as firmware, which provides for dynamic functionality of the device. These peripheral devices with firmware may be referred to as smart devices. However, the firmware of these devices may pose a security threat to the computer system. Malicious firmware may be loaded to the device and can attack a computer system to which it is connected. For example, a device driver may load malicious firmware to the peripheral device after which control of the device may switch to another security domain, exposing that security domain to the malicious firmware and possible harmful attacks.

Conventional systems rely on the smart device's ability to limit a driver's ability to load malicious firmware by verifying device vendor's signature on the firmware. For example, when a driver attempts to load firmware to the smart device, the smart device may verify a signature of the firmware against the device vendor's signature. If the firmware's signature does not match the device vendor's signature, the smart device may prevent the download of the firmware. However, the security of each device depends on the policy provided by the device's vendor. For example, some device vendors may not provide for firmware version validation, or the device may not check the correct information to properly validate the firmware. Additionally, the security of the firmware may depend on the system to which the device is connected. For example, some firmware may be safe for certain systems (e.g., operating systems) but may not be safe for other systems.

If the device allows malicious or vulnerable firmware to be loaded to the device the computer system may then be vulnerable to attacks through the device firmware. For example, the firmware may provide for a vulnerable point for attack over a network. The firmware may be loaded to the device through a device driver of the computer system. After the firmware is loaded, access and control of the device may be transferred from the driver to a different security domain, such as a virtual machine (VM), hypervisor, or supervisor. Therefore, vulnerable or malicious firmware may cause security concerns for virtual environments and users of the virtual environments.

Aspects of the disclosure address the above-noted and other deficiencies by verifying the firmware of a device at a critical safe point to prevent malicious driver attacks of a hypervisor, supervisor, or other security domain. On a security domain switch or other safe point, such as device reset, host start, etc., the hypervisor may read the firmware from the device. The hypervisor may then determine whether the firmware of the device is a certified and secure version of firmware for the device. Accordingly, the firmware version can be verified or failed prior to providing the control of the device to a new security domain, preventing corruption of the security domain.

In some embodiments, the firmware validation is performed by a firmware validation module of the computer system. The firmware validation module may be included in a hypervisor of the computer system. The firmware validation module may perform a validation of firmware of a peripheral device at a safe point, such as an initialization of the peripheral device or change in control of the device between security domains. In one example, the firmware validation module may retrieve the firmware and validate the firmware upon a request to switch control of the device to a security domain that is at a higher security level than the current security domain accessing the device. In one example, to validate the firmware, the firmware validation module may compare a full hash of the firmware to trusted and certified device firmware for the particular operating system and computer hardware of the computer system. In another example, the firmware validation module may compare a signature included in the firmware code to trusted and certified firmware signatures. In one example, after the firmware has been validated, the firmware validation module may write a trusted signature to the firmware of the device (e.g., in a header or other unused code) identifying to the firmware validation module that the firmware is trusted by the firmware validation module. Additionally, the firmware validation module may store an association between the trusted signature and the firmware version from the device.

After the next safe point, the hypervisor may then check if the device firmware includes the trusted signature to quickly determine that it is trusted by the firmware validation module.

Advantages of the present disclosure include increased computer system security when connected to a peripheral device. In particular, validation of firmware at particular safe points, such as security domain changes of a device, reduces the ability of malicious or vulnerable firmware to access or corrupt different security domains of the computer system. Therefore, peripheral devices can be used more safely and reliably across several security domains.

Figure 1:
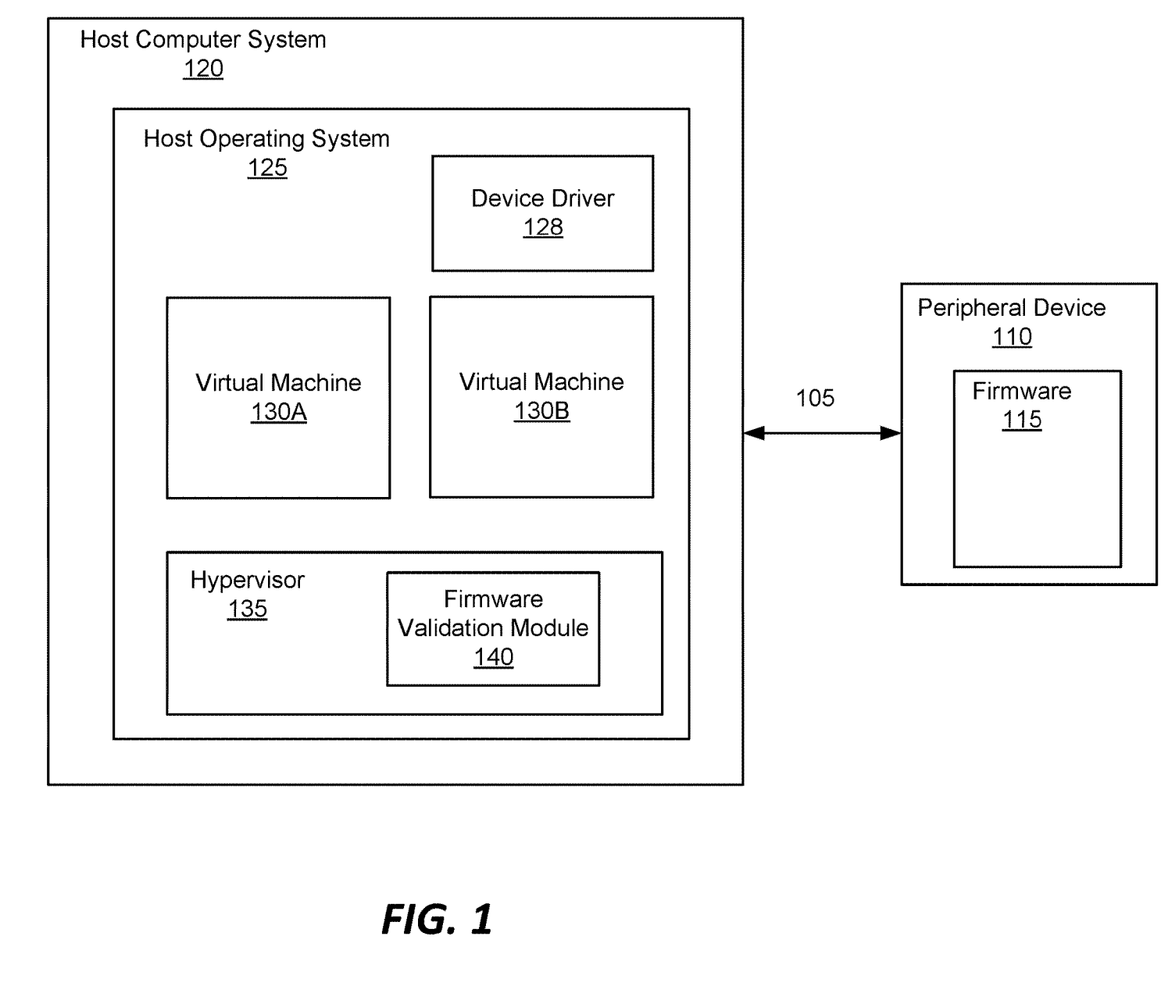
FIG. 1 is a system diagram that illustrates an example system for preventing firmware version corruption attacks, in accordance with some embodiments.

FIG. 1 is a block diagram illustrating an example system 100 according to some embodiments of the disclosure. The system 100 includes a peripheral device 110 coupled to a host computer system 120 via connection 105. Connection 105 may be a peripheral component interconnect (PCI), peripheral component interconnect express (PCIe), a network connection (e.g., local area network, wide area network, etc.), a universal serial bus, or any other type of communicative connection. Host computer system 120 may be any data processing device, such as a desktop computer, a laptop computer, a mainframe computer, a personal digital assistant, a server device, a hand-held device, or any other device configured to process data. Host computer system 120 may include a host operating system 125. The host operating system 125 manages the hardware resources of the computer system and provides functions such as inter-process communication, scheduling, memory management, and so forth. Host operating system 125 may run a hypervisor/supervisor 135 for managing one or more virtual machines 130A-B. Hypervisor 135 may manage hardware resource allocation to the virtual machines 130A-B. For example, hypervisor 135 may manage access control of peripheral device 110. Virtual machines 130A-B may be a software implementation of a machine that executes programs as though it was an actual physical machine.

Peripheral device 110 may be any type of device connectable to a computer system, such as a smart device, memory device, storage device, networking device, or any other type of connected device. Peripheral device 110 may include storage, memory, and a processing device to store firmware 115 and perform functions defined by the firmware 115. Firmware 115 may be loaded to the device directly by a vendor of the peripheral device, downloaded from the vendor via a network and loaded to the peripheral device 110 from the host computer system 120, downloaded to the peripheral device 110 from a third party vendor, etc. In one example, a device driver 128 running on the host operating system 125 of the host computer system 120 may load the firmware 115 to the peripheral device 110.

In one example, the host operating system 125 or the hypervisor 135 may switch access and control of peripheral device 110 between virtual machines 130A-B, the hypervisor 135, the host operating system 125, and any other domain of the host computer system 120. At particular safe points associated with changes in access and control of the peripheral device 110, the hypervisor 135 may read the firmware 115 and determine whether the firmware is certified, safe, and trusted by the hypervisor 135. For example, the safe points may include changes in control of the peripheral device 110 between security domains of the host computer system 120, initialization of the peripheral device 110, or changes in state of the host computer system 120 effecting control of the peripheral device 110, such as start-up or reboot of the host computer system 120.

In one example, the hypervisor 135 may include a firmware validation module 140 to perform validation of the firmware 115 of the peripheral device 110 at particular safe points, as discussed above. Alternatively, the firmware validation module 140 may also be separate from the hypervisor 135. The firmware validation module 140 may read the firmware 115 from the peripheral device 110 at an operational safe point, such as a switch in security domain for control of the peripheral device 110. The firmware validation module 140 may use any method for validating the firmware 115 such as comparing a hash of the firmware 115 to certified firmware or comparing a firmware signature with signatures of certified firmware.

Figure 2:
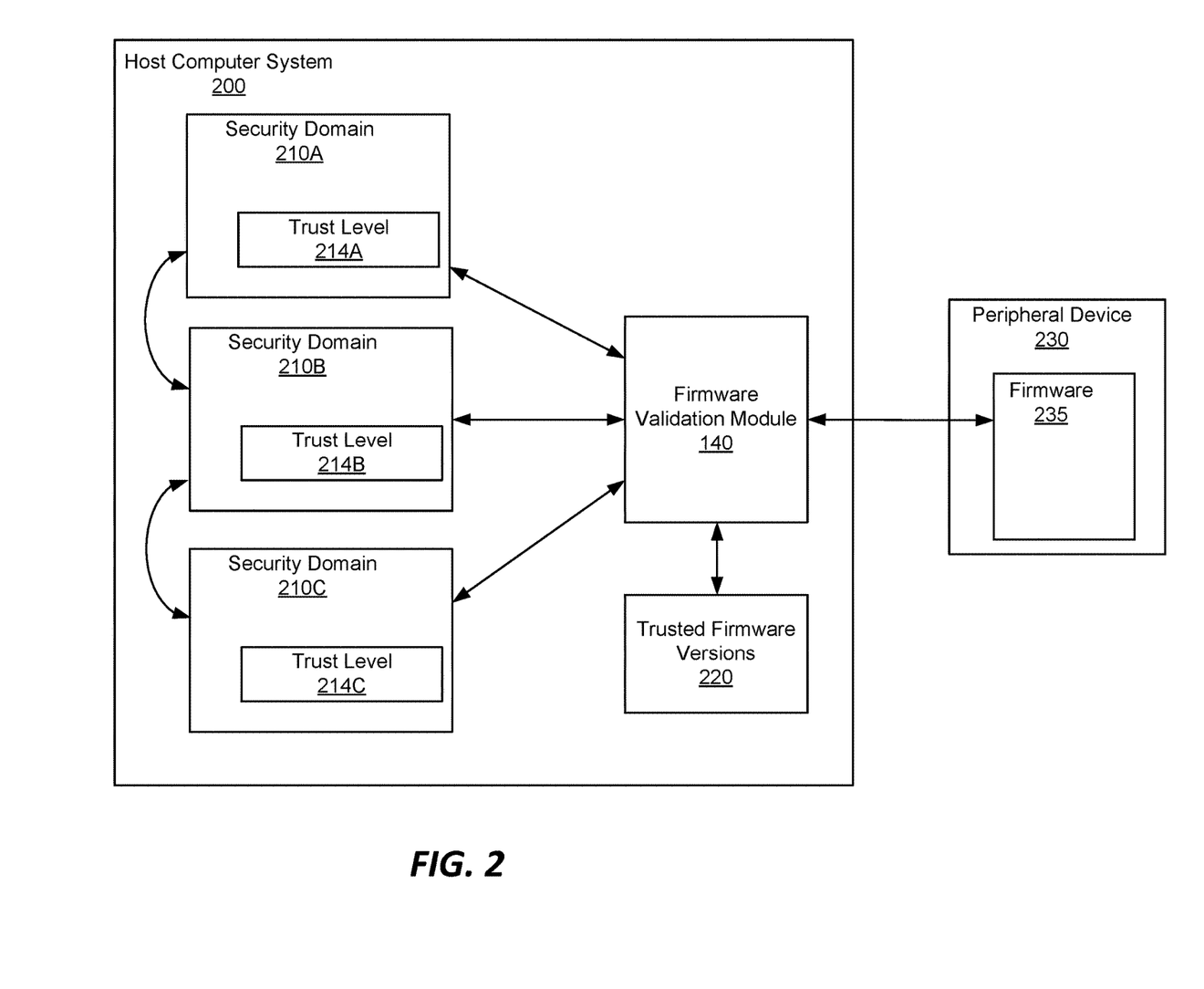
FIG. 2 is a block diagram that illustrates an example computer system for preventing firmware version corruption attacks across security domains of a computer system, in accordance with embodiments of the disclosure.

FIG. 2 is a block diagram that illustrates security domains of a host computer system 200. The host computer system 200 may include security domains 210A-C. Each security domain 210A-C may have an associated trust level 214A-C. Each security domain 210A-C may be an application, a virtual machine, a collection of virtual machines for a tenant of the host computer system 200, a hypervisor, a host operating system or any other software or groups of software defined as a domain with a particular trust level (e.g., trust levels 214A-C). In one example, a peripheral device 230 may be coupled to the host computer system 200. The peripheral device 230 may be controlled and accessed from one of the security domains 210A-C. The peripheral device 230 may be the same or similar to peripheral device 110 described with respect to FIG. 1. In some examples, control of the peripheral device 230 may be transferred between security domains 210A-C. Each trust level 214A-C may include a trust level 214A-C that includes access permissions of the security domains 210A-C. For example, the trust level 214A may include limited access permissions for the host computer system 200, trust level 214B may include intermediate access permissions for the host computer system 200, and trust level 214C may include high level access permissions.

The host computer system 200 may further include a firmware validation module 140 to validate firmware 235 of the peripheral device 230 at certain critical safe points during operation of the host computer system 200. For example, upon switching control of the peripheral device between security domains 210A-C, the firmware validation module 140 may retrieve the firmware 235 from the peripheral device and compare the firmware 235 with one or more trusted firmware versions 220. Accordingly, if the firmware validation module determines that the firmware 235 matches one of the trusted firmware versions 220, the firmware validation module may allow control of the peripheral device 230 to be switched between security domains 210A-C. In one example, the firmware validation module 140 may apply a hash to the firmware 235 and compare the hash to the trusted firmware versions 220.

For example, the firmware validation module 140 may detect that control of peripheral device 230 is switched from security domain 210A (e.g., a virtual machine) to security domain 210B (e.g., a hypervisor). In one example, the firmware validation module 140 may determine whether the trust level 214B of security domain 210B is a higher trust level (e.g., has increased permission) than trust level 214A of security domain 214A. If trust level 214B is higher than trust level 214A, firmware validation module 140 may perform validation of the firmware 235. Otherwise, the firmware validation 140 may ignore the security domain switch. In another example, firmware validation module 140 may perform the validation upon any security domain switch. In response to detecting the security domain switch from security domain 210A to security domain 210B, the firmware validation module 140 may retrieve (i.e., read) the firmware 235 from the peripheral device 230. The firmware validation module 140 may then compare the firmware 235 to trusted firmware versions 220 (e.g., certified versions of firmware). In one example, the firmware validation module 140 may compare a hash of the firmware 235 to trusted firmware versions 220. In another example, the firmware validation module 140 may compare a signature from firmware 235 to signatures of the trusted firmware versions 220. In one example, the trusted firmware versions 220 may be a database of trusted and certified firmware. The trusted firmware versions 220 may be stored locally at the host computer system 200 or remotely (e.g., at a remote server or database). If the firmware validation module 140 determines that the firmware 235 is certified and trusted, then control of the peripheral device 230 may be switched to the security domain 210B.

Figure 3:
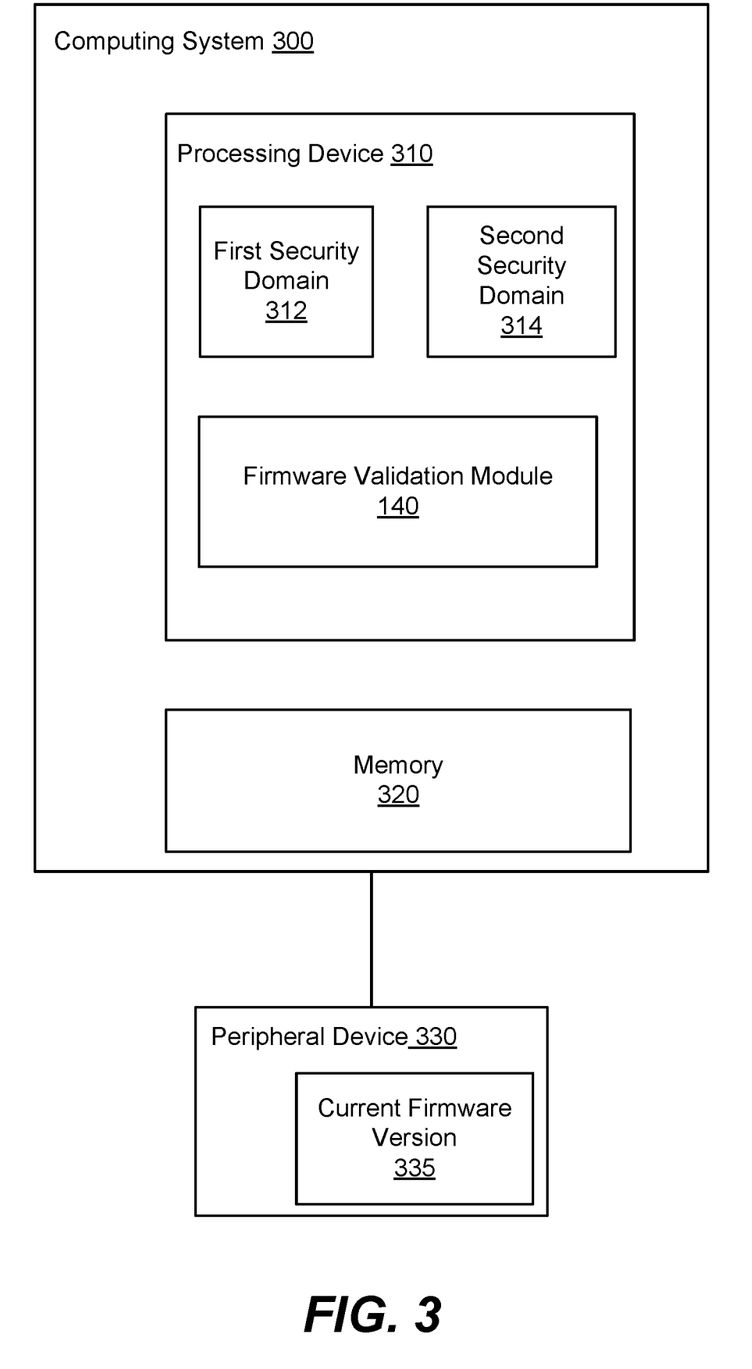
FIG. 3 is a block diagram that illustrates another example system for preventing firmware version corruption attacks, in accordance with some embodiments.

FIG. 3 is a block diagram illustrating a computer system 300 for firmware version corruption prevention, in accordance with some embodiments. Computing system 300 may include a processing device 310 and memory 320. Memory 320 may include volatile memory devices (e.g., random access memory (RAM)), non-volatile memory devices (e.g., flash memory) and/or other types of memory devices. A peripheral device 330 may be coupled to the computing system 300 (e.g., via a PCIe connection, network, or other connection). The peripheral device 330 may include a current firmware version 335 providing functionality to the peripheral device 330. The processing device 310 may include a first security domain 312 and a second security domain 314. The first security domain 312 and second security domain 314 may be an application, a virtual machine, a collection of virtual machines for a tenant of the computer system 300, a hypervisor, a host operating system or any other software or groups of software defined as a domain with a particular trust level.

Processing device 310 may further include firmware validation module 140. Firmware validation module 140 may be the same or similar to firmware validation module as described with respect to FIG. 1. Firmware validation module 140 may detect a change in control of a peripheral device 330 from a first security domain 312 to a second security domain 314 of computer system 300 and in response to detecting the change in control of the peripheral device 330 read a current firmware version 335 of the peripheral device 330 and determine whether the current firmware version 335 of the peripheral device 330 is trusted by the computer system 300. In response to determining that the current firmware version 335 is trusted by the computer system 300, the firmware validation module 140 may then provide control of the peripheral device 330 to the second security domain 314. The firmware validation module 140 may also detect an initialization of the peripheral device 330 on the computer system 300, and in response to detecting the initialization of the peripheral device 330 read the current firmware version 335 of the peripheral device 330 and determine whether the current firmware version 335 of the peripheral device 330 is trusted by the computer system 300.

In one example, to determine whether the current firmware version 335 is trusted by the computer system 300 the firmware validation module 140 may compare the current firmware version 335 to one or more certified versions of firmware associated with the peripheral device 330. In another example, to compare the current firmware version 335 to the one or more certified versions of firmware associated with the peripheral device 330 the firmware validation module 140 may compare a hash of the current firmware version 335 to the one or more certified versions of firmware associated with the peripheral device 330. Alternatively, the firmware validation module 140 may compare a signature included in the current firmware version 335 to known signatures of one or more versions of firmware associated with the peripheral device 330 trusted by the computer system 300.

In one example, in response to determining that the current firmware version 335 is trusted by the computer system 300, the firmware validation module 140 may write a trusted signature to the current firmware version 335, wherein the trusted signature identifies the current firmware version 335 as trusted by the computer system 300.

Figure 4:
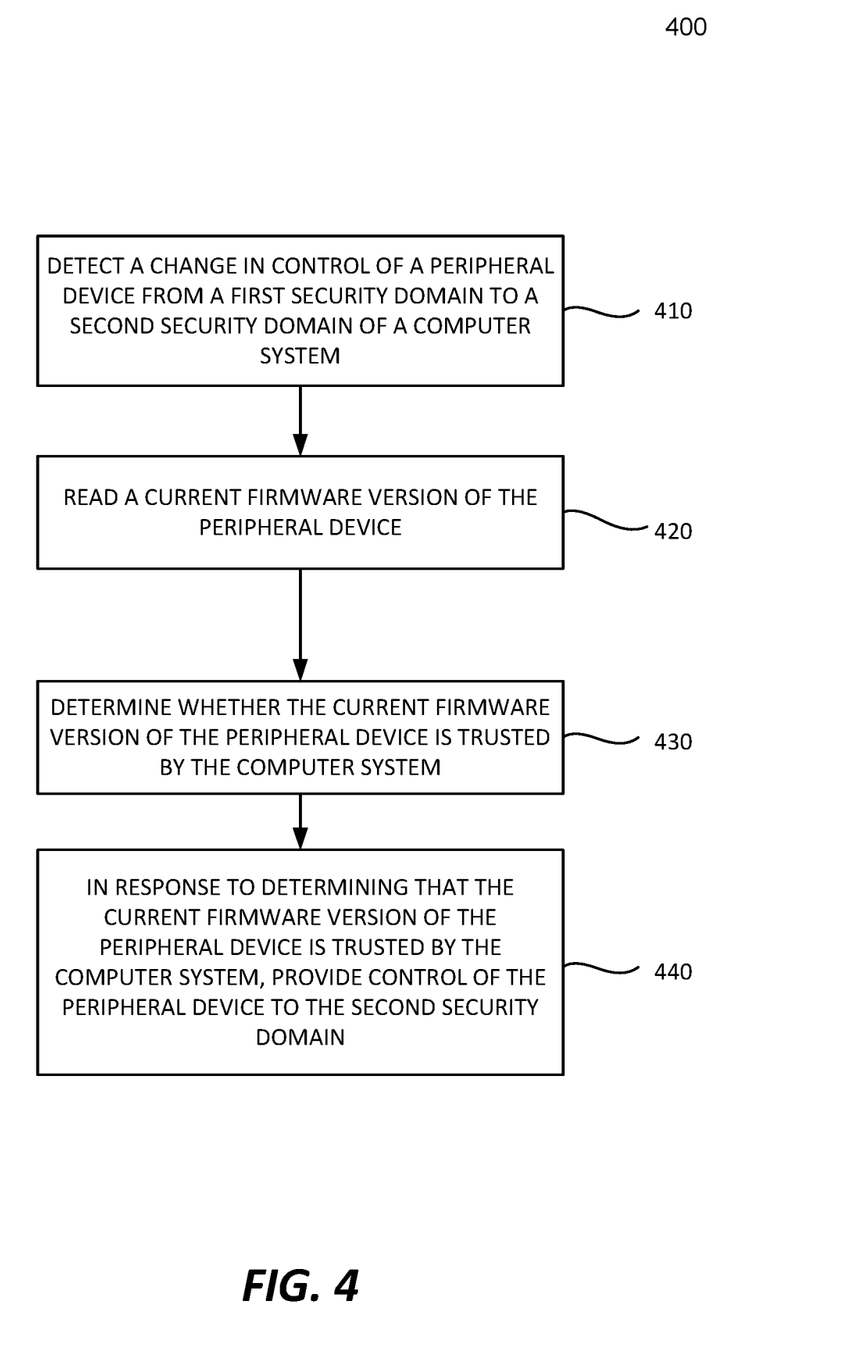
FIG. 4 is a flow diagram of a method of preventing firmware version corruption attacks, in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by firmware validation module 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic detects a changes in control of a peripheral device from a first security domain to a second security domain of a computer system. In one example, the first security domain may have a first trust level and access permissions associated with the first trust level. The second security domain may have a second trust level and access permissions associated with the second trust level. In some examples, the first security domain and second security domain may each be a guest virtual machine, a domain of a virtual tenant, host operating system, etc. For example, the change in control may include a switch from a guest virtual machine to a guest VM of a different tenant, guest virtual machine to a host system, host system to guest virtual machine, a first virtual machine to a second virtual machine, or any other change in control from one entity of the computer system to another entity of the computer system.

At block 420, the processing logic reads a current firmware version of the peripheral device. The firmware may be software loaded or downloaded to the device to provide functionality to the peripheral device. For example, the peripheral device may be a smart device including a memory and a processing device to perform one or more functions for the computer system. A device vendor may load the firmware to the peripheral device prior to distribution of the device. In another example, a device driver of the computer system may download firmware (e.g., from a server of the device vendor) for the device and load the firmware to the device.

At block 430, the processing logic determines whether the current firmware version of the peripheral device is trusted by the computer system. In one example, the processing logic may compare a hash of the entire firmware code to firmware versions that are certified and trusted by the computer system. For example, the processing logic may determine whether the current firmware version is trusted by a hypervisor of the computer system. At block 440, in response to determining that the current firmware version of the peripheral device is trusted by the computer system, provide control of the peripheral device to the second security domain.

Figure 5:
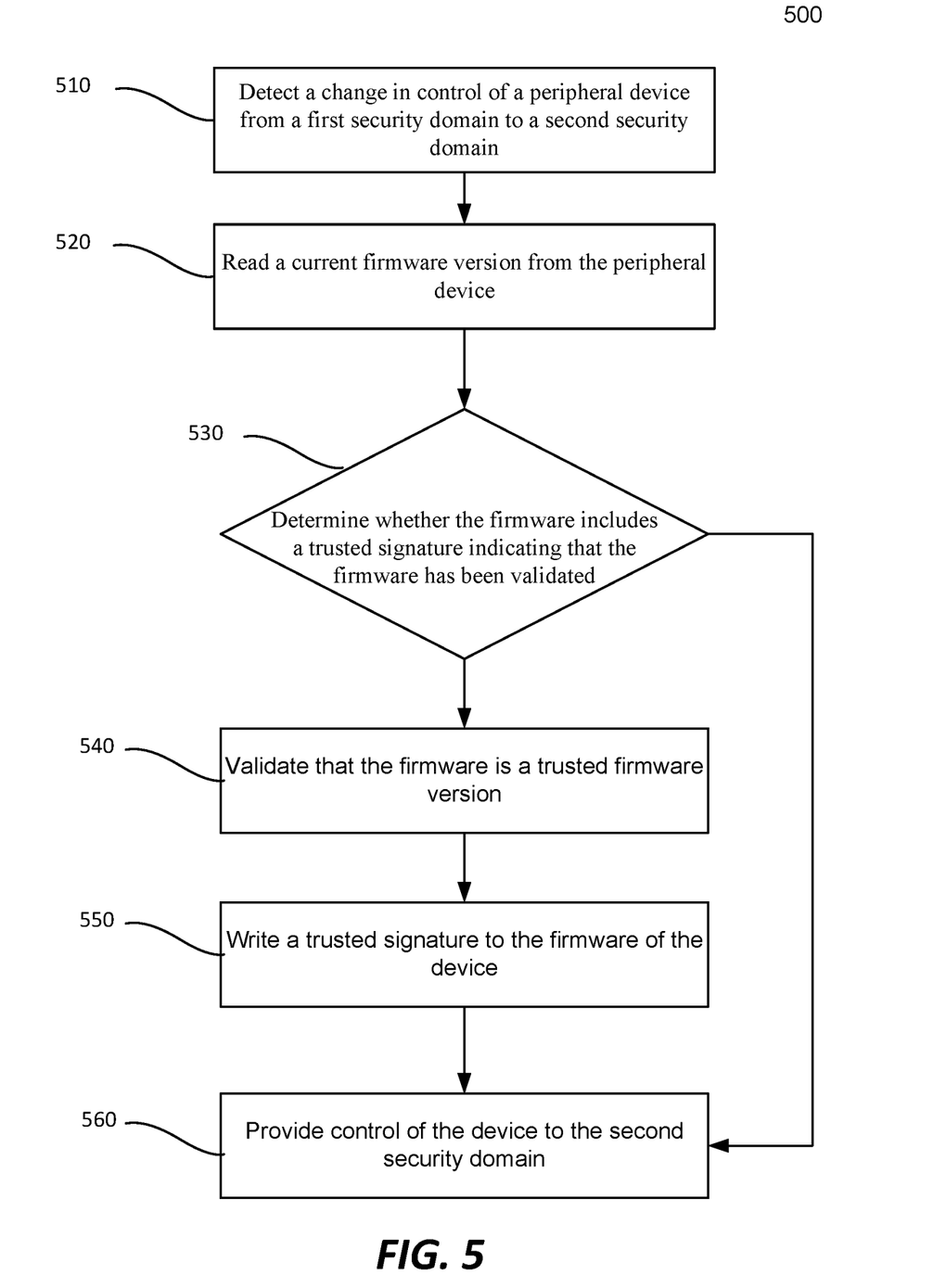
FIG. 5 is a flow diagram of another method of preventing firmware version corruption attacks in accordance with some embodiments.

FIG. 5 is a flow diagram of a method 500 of virtual machine networking configuration migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by firmware validation module 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 400. It is appreciated that the blocks in method 500 may be performed in an order different than presented, and that not all of the blocks in method 500 may be performed.

Method 500 begins at block 510, where the processing logic detects a change in control of a peripheral device from a first security domain to a second security domain. The first security domain may have a first trust level and access permissions associated with the first trust level. The second security domain may have a second trust level and access permissions associated with the second trust level. In some examples, the first security domain and second security domain may each be a guest virtual machine, a domain of a virtual tenant, host operating system, etc. For example, the change in control may include a switch from a guest virtual machine to a guest VM of a different tenant, guest virtual machine to a host system, host system to guest virtual machine, a first virtual machine to a second virtual machine, or any other change in control from one entity of the computer system to another entity of the computer system. In some embodiments, the processing logic may also detect an initialization of the peripheral device, such as on system re-boot, or the like.

At block 520, the processing logic reads a current firmware version from the peripheral device. In one example, the processing logic reads the current firmware version in response to detecting a device control change from one security domain to another. In one example, the processing logic reads the current firmware version in response to determining that the second security domain has a higher trust level (e.g., more access permissions) than the first security domain. The firmware may be software loaded to the device to provide functionality to the peripheral device. For example, the peripheral device may be a smart device including a memory and a processing device to perform one or more functions for the computer system. A device vendor may load the firmware to the peripheral device prior to distribution of the device. In another example, a device driver of the computer system may download firmware (e.g., from a server of the device vendor) for the device and load the firmware to the device.

At block 530, the processing logic determines whether the current device firmware includes a trusted signature indicating that the firmware has been validated (e.g., by a hypervisor of the computer system). The current device firmware may include software for performing one or more functionalities of the peripheral device. The current device firmware may be managed by a vendor of the device. However, the trusted signature may not be included in the firmware provided by the vendor of the device. As discussed below at block 550, the processing logic (e.g., a hypervisor or firmware validation module) may write a trusted signature to the device firmware after an initial validation of the device. For example, after validation the processing logic may store an association between the firmware version and the trusted signature. Then, to determine whether the firmware includes the trusted signature, the processing logic may determine whether a version of the firmware matches the trusted signature.

At block 540, in response to determining that the firmware does not include the trusted signature, the processing logic validates that the firmware is a trusted firmware version. To validate the firmware, the processing logic may compare a hash of the entire firmware code to firmware versions that are certified and trusted by the computer system. For example, the processing logic may determine whether the current firmware version is trusted by a hypervisor of the computer system. In another example, the processing device may identify a signature of the firmware, which may be different from the trusted signature discussed above. The signature may be identified from the header, the version, or other portion of the firmware code. The processing logic may then compare the identified signature with a list of certified and trusted firmware version signatures.

At block 550, the processing logic writes a trusted signature to the firmware of the device. The trusted signature may be a unique signature generated by the hypervisor to identify to processing logic that the firmware is trusted by the hypervisor. The trusted signature may be written to an unused portion of the firmware code in a memory of the peripheral device, such as a header, version, etc. At block 560, the processing logic provides control of the device to the second security domain.

Figure 6:
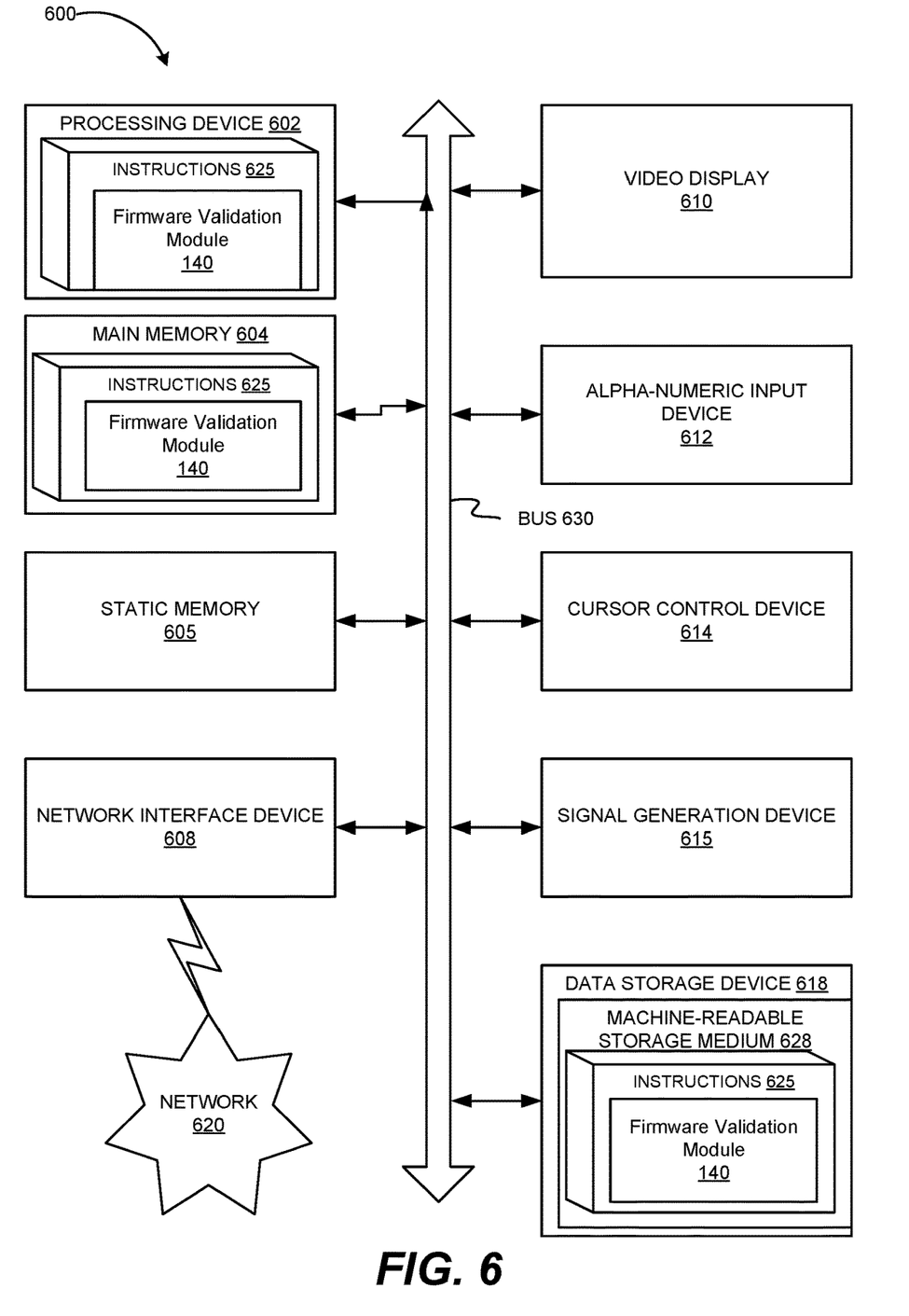
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a networking migration controller, e.g., firmware validation module 140, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    detecting, by a processing device, a change in control of a peripheral device from a first virtualized environment of a first security domain to a second virtualized environment of a second security domain of a computer system;
    in response to detecting the change in control of the peripheral device:
        reading, by the processing device, a current firmware version of the peripheral device; and
        determining, by the processing device, whether the current firmware version of the peripheral device is trusted by the computer system; and
    in response to determining that the current firmware version is trusted by the computer system:
        inserting a trusted signature into the current firmware version for a subsequent verification of the current firmware version; and
        providing control of the peripheral device to the second security domain.

2. The method of claim 1, further comprising:
    detecting an initialization of the peripheral device on the computer system; and
    in response to detecting the initialization of the peripheral device:
    reading, by the processing device, the current firmware version of the peripheral device; and
    determining, by the processing device, whether the current firmware version of the peripheral device is trusted by the computer system.

3. The method of claim 1, wherein determining whether the current firmware version is trusted by the computer system comprises comparing the current firmware version to one or more certified versions of firmware associated with the peripheral device.

4. The method of claim 3, wherein comparing the current firmware version to the one or more certified versions of firmware associated with the peripheral device comprises comparing a hash of the current firmware version to the one or more certified versions of firmware associated with the peripheral device.

5. The method of claim 3, wherein comparing the current firmware version to the one or more certified versions of firmware associated with the peripheral device comprises comparing a signature included in the current firmware version to known signatures of one or more versions of firmware associated with the peripheral device trusted by the computer system.

6. The method of claim 1,
    wherein the trusted signature identifies the current firmware version as trusted by the computer system.

7. The method of claim 6, further comprising:
    detecting a second change in control of the peripheral device from the second security domain to a third security domain of the computer system; and
    determining that the current firmware version on the peripheral device includes the trusted signature; and
    in response to determining that the current firmware version on the peripheral device includes the trusted signature, providing control of the peripheral device to the third security domain.

8. A system comprising:
    a memory; and
    a processing device operatively coupled to the memory, the processing device to:
        detect a change in control of a peripheral device from a first virtualized environment of a first security domain to a second virtualized environment of a second security domain of a computer system;
        in response to detecting the change in control of the peripheral device:
            read a current firmware version of the peripheral device; and
            determine whether the current firmware version of the peripheral device is trusted by the computer system; and
        in response to determining that the current firmware version is trusted by the computer system:
            insert a trusted signature into the current firmware version for a subsequent verification of the current firmware version; and
            provide control of the peripheral device to the second security domain.

9. The system of claim 8, wherein the processing device is further to:
    detect an initialization of the peripheral device on the computer system; and
    in response to detecting the initialization of the peripheral device:
    read the current firmware version of the peripheral device; and
    determine whether the current firmware version of the peripheral device is trusted by the computer system.

10. The system of claim 8, wherein to determine whether the current firmware version is trusted by the computer system the processing device is to compare the current firmware version to one or more certified versions of firmware associated with the peripheral device.

11. The system of claim 10, wherein to compare the current firmware version to the one or more certified versions of firmware associated with the peripheral device the processing device is to compare a hash of the current firmware version to the one or more certified versions of firmware associated with the peripheral device.

12. The system of claim 10, wherein to compare the current firmware version to the one or more certified versions of firmware associated with the peripheral device the processing device is to compare a signature included in the current firmware version to known signatures of one or more versions of firmware associated with the peripheral device trusted by the computer system.

13. The system of claim 8,
wherein the trusted signature identifies the current firmware version as trusted by the computer system.

14. The system of claim 13, wherein the processing device is further to:
detect a second change in control of the peripheral device from the second security domain to a third security domain of the computer system; and
determine that the current firmware version on the peripheral device includes the trusted signature; and
in response to determining that the current firmware version on the peripheral device includes the trusted signature, provide control of the peripheral device to the third security domain.

15. A non-transitory computer-readable storage medium including instructions that, when executed by a processing device, cause the processing device to:
detect, by the processing device, a change in control of a peripheral device from a first virtualized environment of a first security domain to a second virtualized environment of a second security domain of a computer system;
in response to detecting the change in control of the peripheral device:
read, by the processing device, a current firmware version of the peripheral device; and
determine, by the processing device, whether the current firmware version of the peripheral device is trusted by the computer system; and
in response to determining that the current firmware version is trusted by the computer system:
insert a trusted signature into the current firmware version for a subsequent verification of the current firmware version; and
provide control of the peripheral device to the second security domain.

16. The non-transitory computer-readable storage medium of claim 15, wherein the processing device is further to:
detect an initialization of the peripheral device on the computer system; and
in response to detecting the initialization of the peripheral device:
read the current firmware version of the peripheral device; and
determine whether the current firmware version of the peripheral device is trusted by the computer system.

17. The non-transitory computer-readable storage medium of claim 15, wherein to determine whether the current firmware version is trusted by the computer system the processing device is to compare the current firmware version to one or more certified versions of firmware associated with the peripheral device.

18. The non-transitory computer-readable storage medium of claim 17, wherein to compare the current firmware version to the one or more certified versions of firmware associated with the peripheral device the processing device is to compare a hash of the current firmware version to the one or more certified versions of firmware associated with the peripheral device.

19. The non-transitory computer-readable storage medium of claim 17, wherein to compare the current firmware version to the one or more certified versions of firmware associated with the peripheral device the processing device is to compare a signature included in the current firmware version to known signatures of one or more versions of firmware associated with the peripheral device trusted by the computer system.

20. The non-transitory computer-readable storage medium of claim 15, wherein the trusted signature identifies the current firmware version as trusted by the computer system.

* * * * *